(12) United States Patent
Goldsmith et al.

(10) Patent No.: US 8,908,973 B2
(45) Date of Patent: Dec. 9, 2014

(54) HANDWRITTEN CHARACTER RECOGNITION INTERFACE

(75) Inventors: Deborah Eileen Goldsmith, Los Gatos, CA (US); Leland Douglas Collins, Jr., Palo Alto, CA (US); Elizabeth Caroline Furches, San Francisco, CA (US); Ken Kocienda, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 725 days.

(21) Appl. No.: 12/042,296

(22) Filed: Mar. 4, 2008

(65) Prior Publication Data

US 2009/0226091 A1  Sep. 10, 2009

(51) Int. Cl.
*G06K 9/00* (2006.01)
*G06F 3/0488* (2013.01)

(52) U.S. Cl.
CPC ........ *G06F 3/04883* (2013.01); *G06K 9/00436* (2013.01)
USPC ............ 382/189; 382/187; 382/188; 382/186

(58) Field of Classification Search
CPC ... G06F 3/04883; G06F 3/0488; G06F 3/041; G06F 3/017; G06F 3/03545; G06F 3/0883; G06F 17/24; G06K 9/00422; G06K 2209/011; G06K 9/222
USPC .......................................... 382/185, 187, 189
See application file for complete search history.

(56) References Cited

U.S. PATENT DOCUMENTS

| | | |
|---|---|---|
| 5,379,057 A | 1/1995 | Clough et al. |
| 5,483,261 A | 1/1996 | Yasutake |
| 5,488,204 A | 1/1996 | Mead et al. |
| 5,535,119 A | 7/1996 | Ito et al. |
| 5,675,362 A | 10/1997 | Clough et al. |
| 5,825,352 A | 10/1998 | Bisset et al. |
| 5,835,079 A | 11/1998 | Shieh |
| 5,880,411 A | 3/1999 | Gillespie et al. |
| 5,959,629 A | 9/1999 | Masui |
| 6,115,053 A | 9/2000 | Perlin |
| 6,188,391 B1 | 2/2001 | Seely et al. |
| 6,278,968 B1 | 8/2001 | Franz et al. |
| 6,310,610 B1 | 10/2001 | Beaton et al. |
| 6,323,846 B1 * | 11/2001 | Westerman et al. .......... 345/173 |

(Continued)

FOREIGN PATENT DOCUMENTS

| | | |
|---|---|---|
| CN | 1949158 | 4/2007 |
| EP | 1 698 982 | 9/2006 |

(Continued)

OTHER PUBLICATIONS

International Search Report and Written Opinion from International application No. PCT/US2009/033696 mailed Apr. 29, 2009, 14 pages.

T. Masui, "An Efficient Text Input Method for Pen-based Computers," Proceedings of the ACM Conference on Human Factors in Computing System (CHI '98), Apr. 1998, ACM press, pp. 328-335.

(Continued)

*Primary Examiner* — Edward Park

(74) *Attorney, Agent, or Firm* — Morrison & Foerster LLP

(57) ABSTRACT

Methods, systems, and apparatus, including computer program products, for inputting text. A handwriting area is presented on a touch-sensitive display of a device. A handwritten input is received in the handwriting area. One or more candidates are identified for the handwritten input and presented. An input selecting one of the candidates is received. The selected candidate is presented as a current input in a text input area of the touch sensitive display.

20 Claims, 9 Drawing Sheets

(56) References Cited

U.S. PATENT DOCUMENTS

| | | | |
|---|---|---|---|
| 6,385,339 B1* | 5/2002 | Yokota et al. | 382/181 |
| 6,570,557 B1 | 5/2003 | Westerman et al. | |
| 6,661,409 B2* | 12/2003 | Demartines et al. | 345/173 |
| 6,677,932 B1 | 1/2004 | Westerman | |
| 6,690,387 B2 | 2/2004 | Zimmerman et al. | |
| 6,766,179 B1 | 7/2004 | Shiau et al. | |
| 6,888,536 B2 | 5/2005 | Westerman et al. | |
| 7,015,894 B2 | 3/2006 | Morohoshi | |
| 7,030,863 B2 | 4/2006 | Longe et al. | |
| 7,096,432 B2 | 8/2006 | Huapaya et al. | |
| 7,137,076 B2* | 11/2006 | Iwema et al. | 715/863 |
| 7,147,562 B2 | 12/2006 | Ohara et al. | |
| 7,184,064 B2 | 2/2007 | Zimmerman et al. | |
| 7,506,271 B2* | 3/2009 | Wang et al. | 715/809 |
| 7,663,607 B2 | 2/2010 | Hotelling et al. | |
| 8,479,122 B2 | 7/2013 | Hotelling et al. | |
| 2002/0167545 A1 | 11/2002 | Kang et al. | |
| 2002/0168107 A1* | 11/2002 | Tang et al. | 382/187 |
| 2003/0160817 A1 | 8/2003 | Ishida et al. | |
| 2003/0216913 A1* | 11/2003 | Keely et al. | 704/235 |
| 2004/0140956 A1 | 7/2004 | Kushler et al. | |
| 2004/0230912 A1 | 11/2004 | Clow et al. | |
| 2005/0024341 A1* | 2/2005 | Gillespie et al. | 345/173 |
| 2005/0099408 A1 | 5/2005 | Seto et al. | |
| 2005/0152600 A1 | 7/2005 | Chen et al. | |
| 2005/0174333 A1 | 8/2005 | Robinson et al. | |
| 2005/0234722 A1* | 10/2005 | Robinson et al. | 704/257 |
| 2006/0026521 A1 | 2/2006 | Hotelling et al. | |
| 2006/0053387 A1 | 3/2006 | Ording | |
| 2006/0085757 A1 | 4/2006 | Andre et al. | |
| 2006/0117067 A1 | 6/2006 | Wright et al. | |
| 2006/0144211 A1 | 7/2006 | Yoshimoto | |
| 2006/0197753 A1 | 9/2006 | Hotelling | |
| 2006/0274051 A1 | 12/2006 | Longe et al. | |
| 2007/0120822 A1 | 5/2007 | Iso | |
| 2008/0030481 A1 | 2/2008 | Gunn et al. | |
| 2008/0094356 A1 | 4/2008 | Ording et al. | |
| 2008/0240568 A1* | 10/2008 | Tonouchi | 382/186 |
| 2009/0037837 A1 | 2/2009 | Raghunath et al. | |
| 2009/0058823 A1 | 3/2009 | Kocienda | |
| 2009/0077464 A1 | 3/2009 | Goldsmith et al. | |
| 2009/0225041 A1 | 9/2009 | Kida et al. | |
| 2009/0265669 A1 | 10/2009 | Kida et al. | |

FOREIGN PATENT DOCUMENTS

| | | |
|---|---|---|
| JP | 08-272787 | 10/1996 |
| JP | 10-049272 | 2/1998 |
| JP | 2000-112636 | 4/2000 |
| JP | 2002-108543 | 4/2002 |
| JP | 03-314276 | 8/2002 |
| JP | 2002-0325965 | 11/2002 |
| JP | 2005-092441 | 4/2005 |
| WO | WO 00/74240 | 12/2000 |
| WO | WO 2005/064587 | 7/2005 |
| WO | WO 2007/037809 | 4/2007 |
| WO | WO 2007/047188 | 4/2007 |
| WO | WO 2007/070223 | 6/2007 |
| WO | WO 2009/032483 | 3/2009 |
| WO | WO 2009/111138 | 9/2009 |

OTHER PUBLICATIONS

T. Masui, "POBox: An Efficient Text Input Method for Handheld and Ubiquitous Computers," Proceedings of the Internation Symposium on Handheld and Ubiquitous Computer (HUC '99), Sep. 1999, pp. 289-300.

C. Liu et al., "Online Recognition of Chinese Characters: The State-of-the-Art," IEEE Transactions on Pattern Analysis and Machine Intelligence, vol. 26, No. 2, Feb. 2004, pp. 198-213.

H. Sacher, "Interactions in Chinese: Designing Interfaces for Asian Languages," Interactions Magazine, vol. 5, Issue 5, Sep.-Oct. 1998, pp. 28-38.

International Search Report and Written Opinion, dated Feb. 18, 2009, issued in International Application No. PCT/US2009/072803.

Invitation to Pay Fees and Partial International Search Report, dated Nov. 11, 2008, issued in International Application No. PCT/US2009/072803.

Kida et al., "Language Input Interface on a Device", U.S. Appl. No. 12/107,711, filed Apr. 22, 2008.

Goldsmith et al., "Identification of Candidate Characters for Text Input", U.S. Appl. No. 12/167,044, filed Jul. 2, 2008.

Chou, "Zhuyin Input Interface on a Device", U.S. Appl. No. 12/476,121, filed Jun. 1, 2009.

Authorized officer Philippe Becamel, International Preliminary Report on Patentability in PCT/US2009/033696 mailed Sep. 16, 2010, 7 pages.

International Preliminary Report on Patentability in International Application No. PCT/US2009/072803 mailed Mar. 18, 2010.

Translated First Office Action dated Jul. 29, 2010 issued in Chinese Application No. 200910118235.X, 9 pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

HANDWRITTEN CHARACTER RECOGNITION INTERFACE

BACKGROUND

The subject matter of this specification is related generally to text input interfaces.

A computer device can be configured to receive input of text and characters from a computer keyboard. Modern computer keyboards are composed of rectangular or near-rectangular keys, and characters, such as the letters A-Z in the English alphabet, are usually engraved or printed on the keys. Generally, each press of a key corresponds to typing of a single character.

Traditional computer keyboards may be too large for portable devices, such as mobile phones, multimedia players, or personal digital assistants (PDAs). Some portable devices include a smaller version of the traditional computer keyboard or use a virtual keyboard to receive user input. A virtual keyboard can be of the form of a software application or a feature of a software application to simulate a computer keyboard. For example, in a portable device with a touch-sensitive display, a virtual keyboard can be used by a user to input text by selecting or tabbing areas of the touch-sensitive display corresponding to keys of the virtual keyboard.

These smaller keyboards and virtual keyboards may have keys that correspond to more than one character. For example, some of the keys can, by default, correspond to a character in the English language, for example, the letter "a," and may also correspond to other additional characters, such as another letter or the letter with an accent option, e.g., the character "ä," or other characters with accent options. Because of the physical limitations (e.g., size) of the virtual keyboard, a user may find it difficult to type characters not readily available on the virtual keyboard.

Input methods for devices having multi-language environments can present unique challenges with respect to input and spelling correction which may need to be tailored to the selected language to ensure accuracy and an efficient workflow.

SUMMARY

In general, one aspect of the subject matter described in this specification can be embodied in methods that include the actions of presenting a handwriting area on a touch-sensitive display of a device; receiving a handwritten input in the handwriting area; identifying one or more candidates for the handwritten input; presenting the candidates; receiving an input selecting one of the candidates; and presenting the selected candidate as a current input in a text input area of the touch sensitive display. Other embodiments of this aspect include corresponding systems, apparatus, devices, computer program products, and computer readable media.

Particular embodiments of the subject matter described in this specification can be implemented to realize one or more of the following advantages. Asian characters can be input on a portable device more efficiently.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Example Mobile Device

Figure 1:
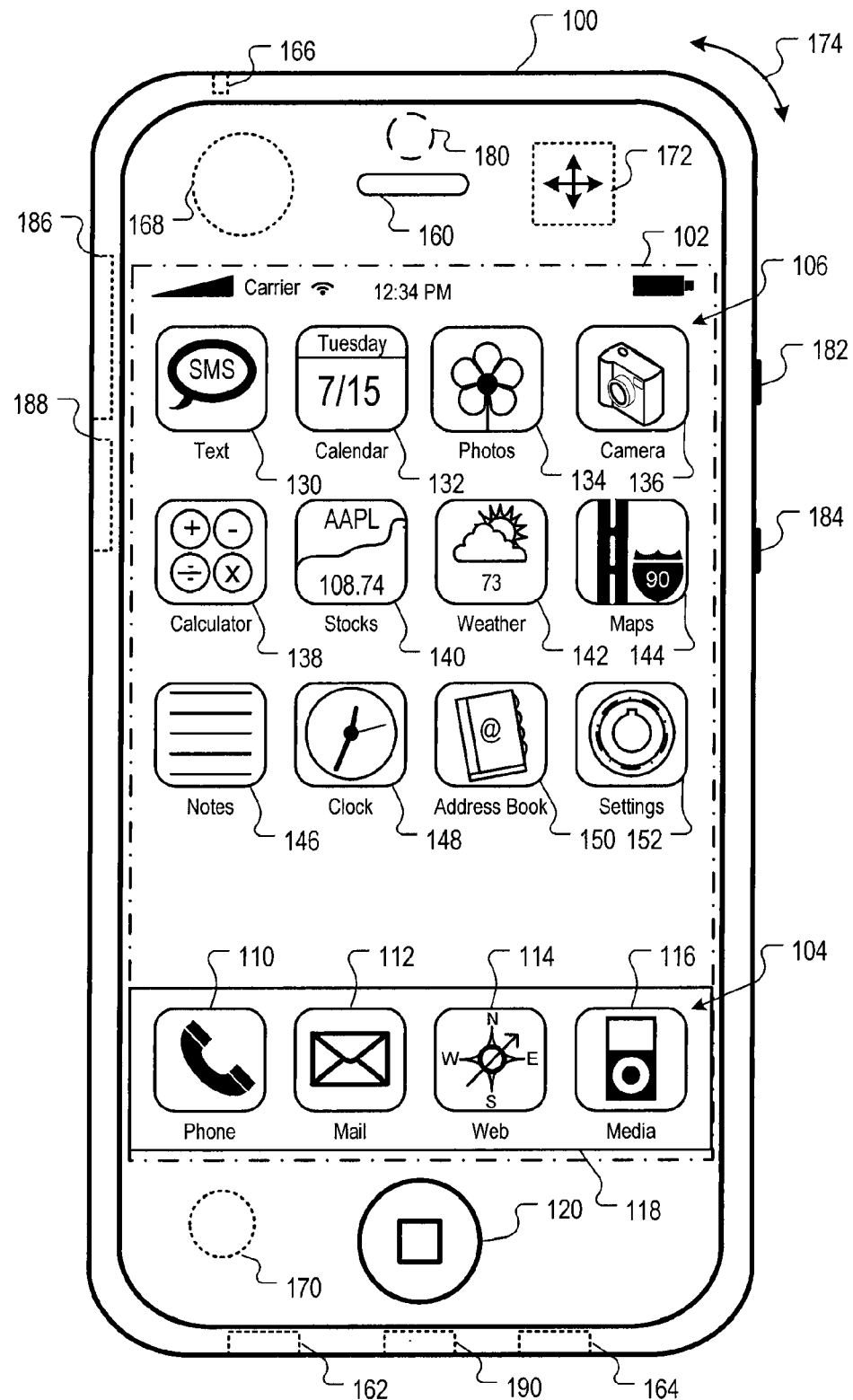
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1. Touching one of the objects 110, 112, 114, or 116 can, for example, invoke corresponding functionality.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150, and 152 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Mobile Device Architecture

Figure 2:
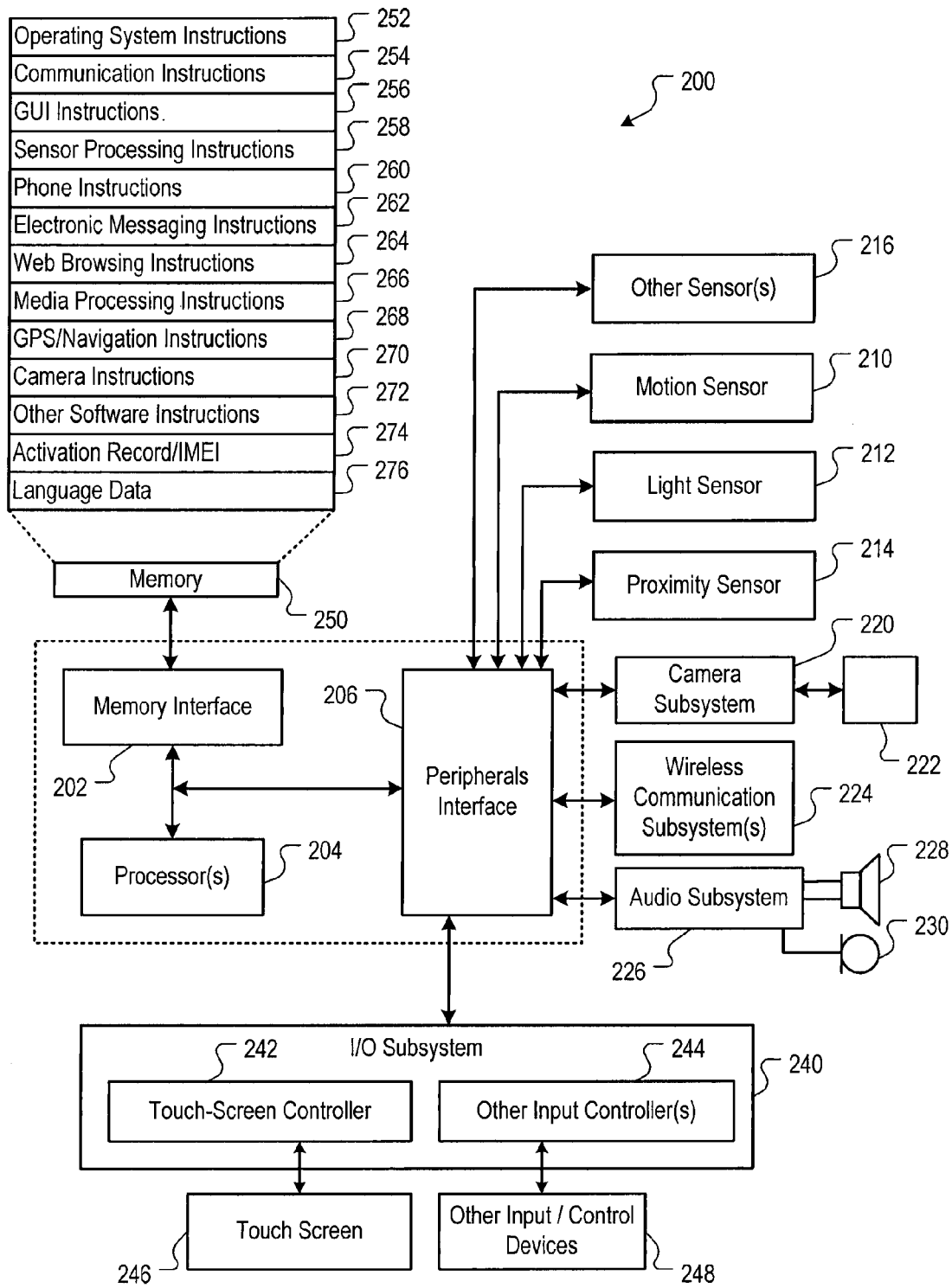
FIG. 2 is a block diagram of an example implementation of the mobile device of FIG. 1.

FIG. 2 is a block diagram 200 of an example implementation of the mobile device 100 of FIG. 1. The mobile device 100 can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. The various components in the mobile device 100 can be coupled by one or more communication buses or signal lines.

Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate the orientation, lighting, and proximity functions described with respect to FIG. 1. Other sensors 216 can also be connected to the peripherals interface 206, such as a positioning system (e.g., GPS receiver), a temperature sensor, a biometric sensor, or other sensing device, to facilitate related functionalities.

A camera subsystem 220 and an optical sensor 222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 224, which can include radio frequency receivers and transmitters and/or optical (e.g., infrared) receivers and transmitters. The specific design and implementation of the communication subsystem 224 can depend on the communication network(s) over which the mobile device 100 is intended to operate. For example, a mobile device 100 may include communication subsystems 224 designed to operate over a GSM network, a GPRS network, an EDGE network, a Wi-Fi or WiMax network, and a Bluetooth™ network. In particular, the wireless communication subsystems 224 may include hosting protocols such that the device 100 may be configured as a base station for other wireless devices.

An audio subsystem 226 can be coupled to a speaker 228 and a microphone 230 to facilitate voice-enabled functions, such as voice recognition, voice replication, digital recording, and telephony functions.

The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246.

The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230.

In one implementation, a pressing of the button for a first duration may disengage a lock of the touch screen 246; and a pressing of the button for a second duration that is longer than the first duration may turn power to the mobile device 100 on or off. The user may be able to customize a functionality of one or more of the buttons. The touch screen 246 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 202 can be coupled to memory 250. The memory 250 can include high-speed random access memory and/or non-volatile memory, such as one or more magnetic disk storage devices, one or more optical storage devices, and/or flash memory (e.g., NAND, NOR). The memory 250 can store an operating system 252, such as Darwin, RTXC, LINUX, UNIX, OS X, WINDOWS, or an embedded operating system such as VxWorks. The operating system 252 may include instructions for handling basic system services and for performing hardware dependent tasks. In some implementations, the operating system 252 can be a kernel (e.g., UNIX kernel).

The memory 250 may also store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/Navigation instructions 268 to facilitate GPS and navigation-related processes and instructions; camera instructions 270 to facilitate camera-related processes and functions; and/or other software instructions 272 to facilitate other processes and functions, e.g., security processes and functions. The memory 250 may also store other software instructions (not shown), such as web video instructions to facilitate web video-related processes and functions; and/or web shopping instructions to facilitate web shopping-related processes and functions. In some implementations, the media processing instructions 266 are divided into audio processing instructions and video processing instructions to facilitate audio processing-related processes and functions and video processing-related processes and functions, respectively. An activation record and International Mobile Equipment Identity (IMEI) 274 or similar hardware identifier can also be stored in memory 250.

Language data 276 can also be stored in memory 250. Language data 276 can include, for example, word dictionaries (i.e., list of possible words in a language) for one or more languages, dictionaries of characters and corresponding phonetics, one or more corpuses of characters and character compounds, and so on.

Each of the above identified instructions and applications can correspond to a set of instructions for performing one or more functions described above. These instructions need not be implemented as separate software programs, procedures, or modules. The memory 250 can include additional instructions or fewer instructions. Furthermore, various functions of the mobile device 100 may be implemented in hardware and/or in software, including in one or more signal processing and/or application specific integrated circuits.

Handwriting Recognition Interface

FIGS. 3A-3F illustrate an example user interface for entering characters using handwriting recognition on a mobile device 100. Mobile device 100 can display a text input area 302 and a handwriting area 304 on the touch sensitive display 102. The text input area 302 can be any area where input text can be displayed, e.g., a note-taking application, an email application, and so on.

For convenience, the implementations described in this specification are described in reference to entry of Chinese characters (simplified and/or traditional). It should be appreciated that the described implementations can be adapted for other languages.

The handwriting area 304 provides a region where a user can draw or write a handwritten input. The touch-sensitive display 102 can display one or more virtual keys, buttons, or the like, that provide additional functionality. In some implementations, the additional keys include one or more of: a delete/backspace key 303 for deleting the last input character, a space key 308 for entering white space, a return key 310 for entering a line break or the like, and a numbers and punctuation keyboard toggle key 314 for toggling between the handwriting area 304 and a virtual keyboard with number and punctuation keys.

In some implementations, the handwriting area 304 is accompanied by one or more virtual candidate keys 306. The virtual candidate keys 306 can be arranged in a vertical column adjacent to the handwriting area 304. A candidate for a handwritten input can be selected using the candidate keys 306, further details of which are described below.

In some implementations, there is a virtual button (not shown) for switching amongst the handwriting recognition user interface and virtual keyboards for various languages.

Figure 3A:
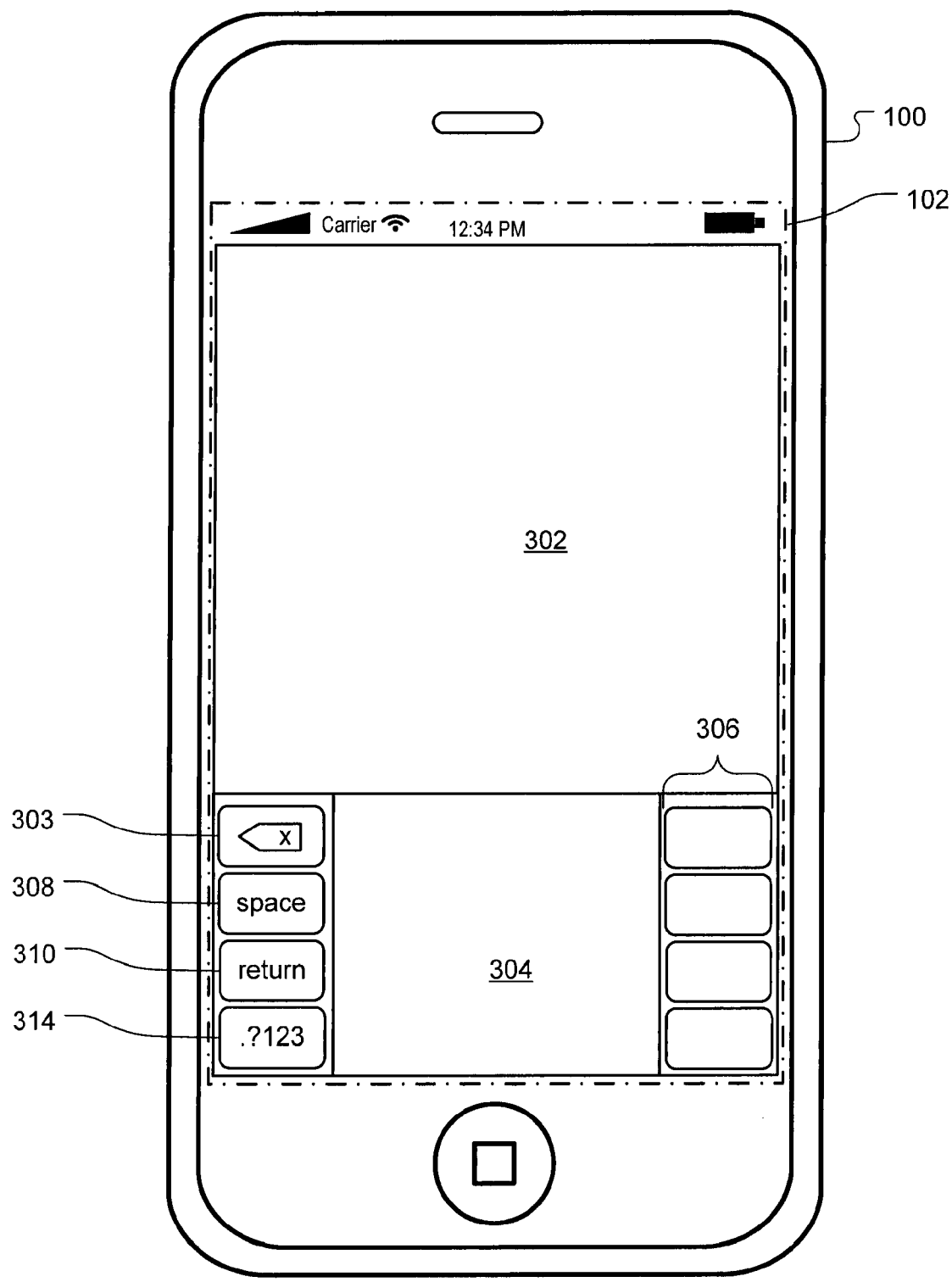
FIGS. 3A-3F illustrate an example user interface for entering characters using handwriting recognition.
Figure 3B:
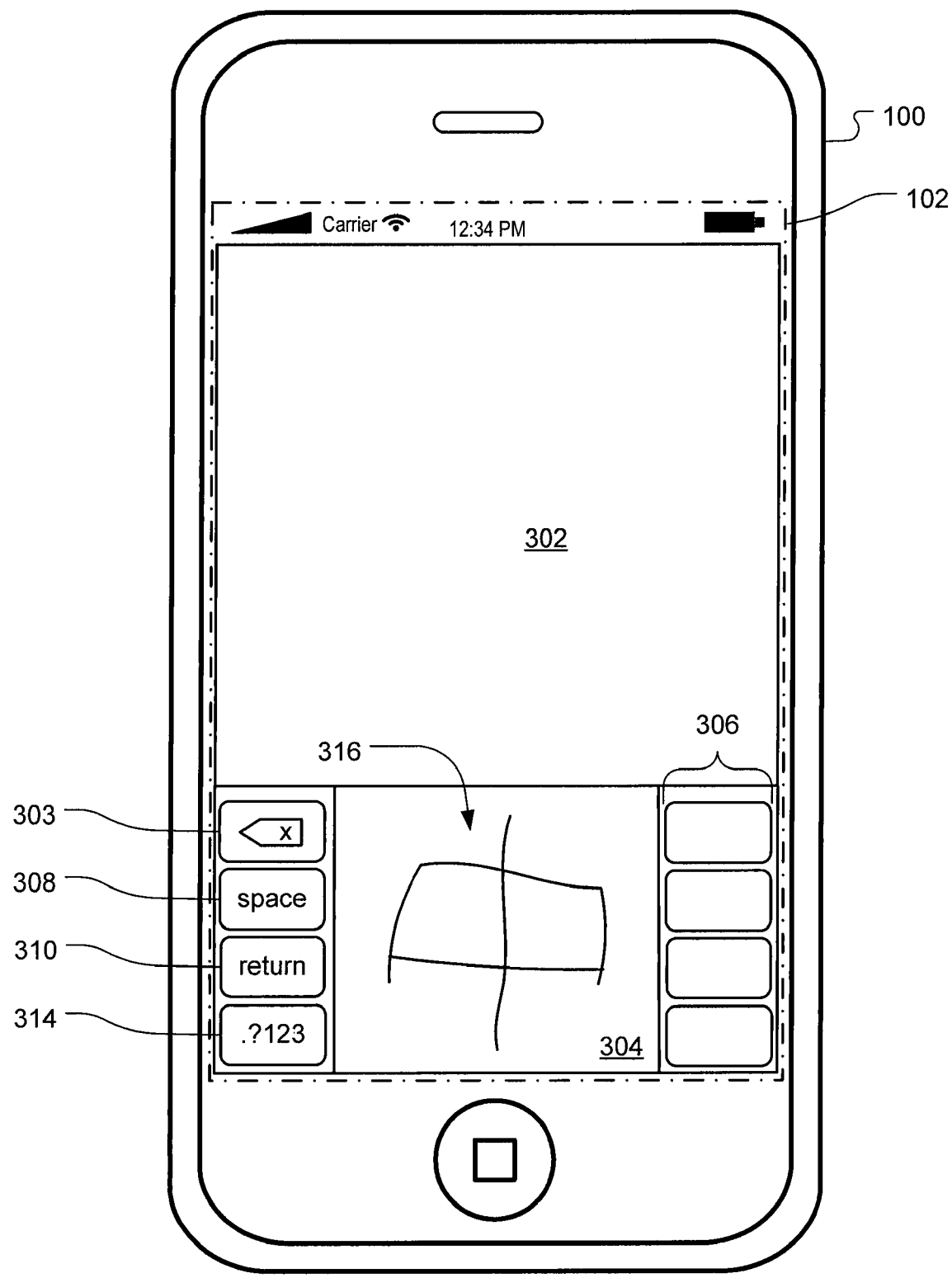

A user can draw a handwritten input 316 in the handwriting area 304, as shown in FIG. 3B. The device 100 can compare the handwritten input to characters and words in a dictionary, corpus, repository, or the like. For example, the device 100 can compare the handwritten input against Chinese characters and words formed from Chinese characters in a Chinese character dictionary. Characters or words in the dictionary that include an initial character matching or resembling the handwritten input can be identified as candidates.

Figure 3C:
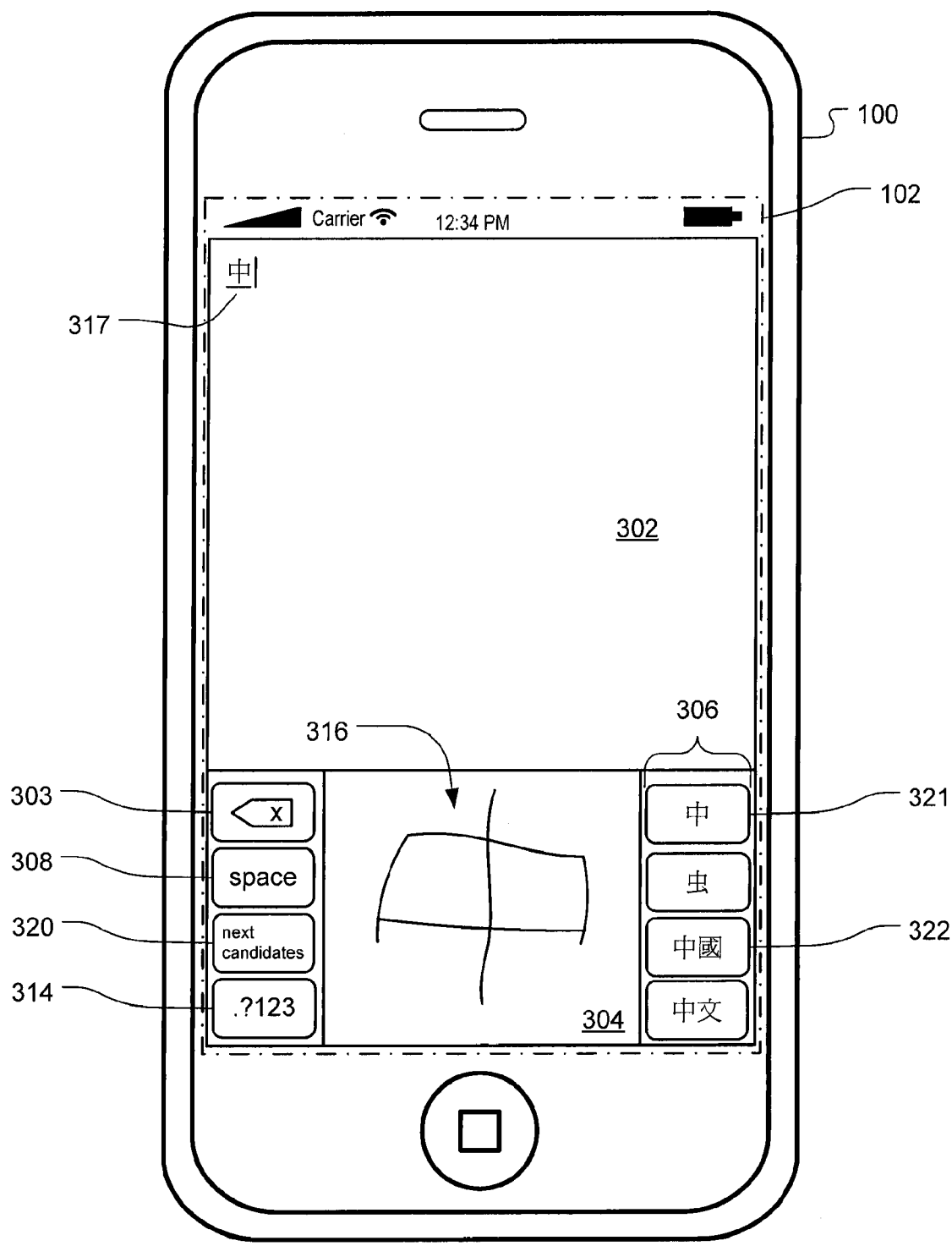

The device 100 can display the candidates in the candidate keys 306, as shown in FIG. 3C. Each candidate key can correspond to a candidate character or candidate word or phrase that is a combination of multiple characters. In some implementations, a candidate can also displayed inline in the text entry area 302 as the provisional current input 317. In some implementations, the provisional current input 317 is displayed with underlining to indicate that the input 317 is provisional, pending confirmation by the user.

In some implementations, the candidate keys 306 are presented in an order that is based on which candidates are the "best" candidates, according to the device 100, for the handwritten input 316. Criteria for determining "best" candidates can include word or character frequency and degree of match to the handwritten input, to name a few examples. In some implementations, the "best" candidate is displayed inline as the provisional current input 317 and is displayed on the top amongst the candidate keys 306. For example, in FIG. 3C, the character "中" is the best candidate for the handwritten input 316; "中" is displayed inline as input 317 and is the first of the candidate keys 306.

Figure 3D:
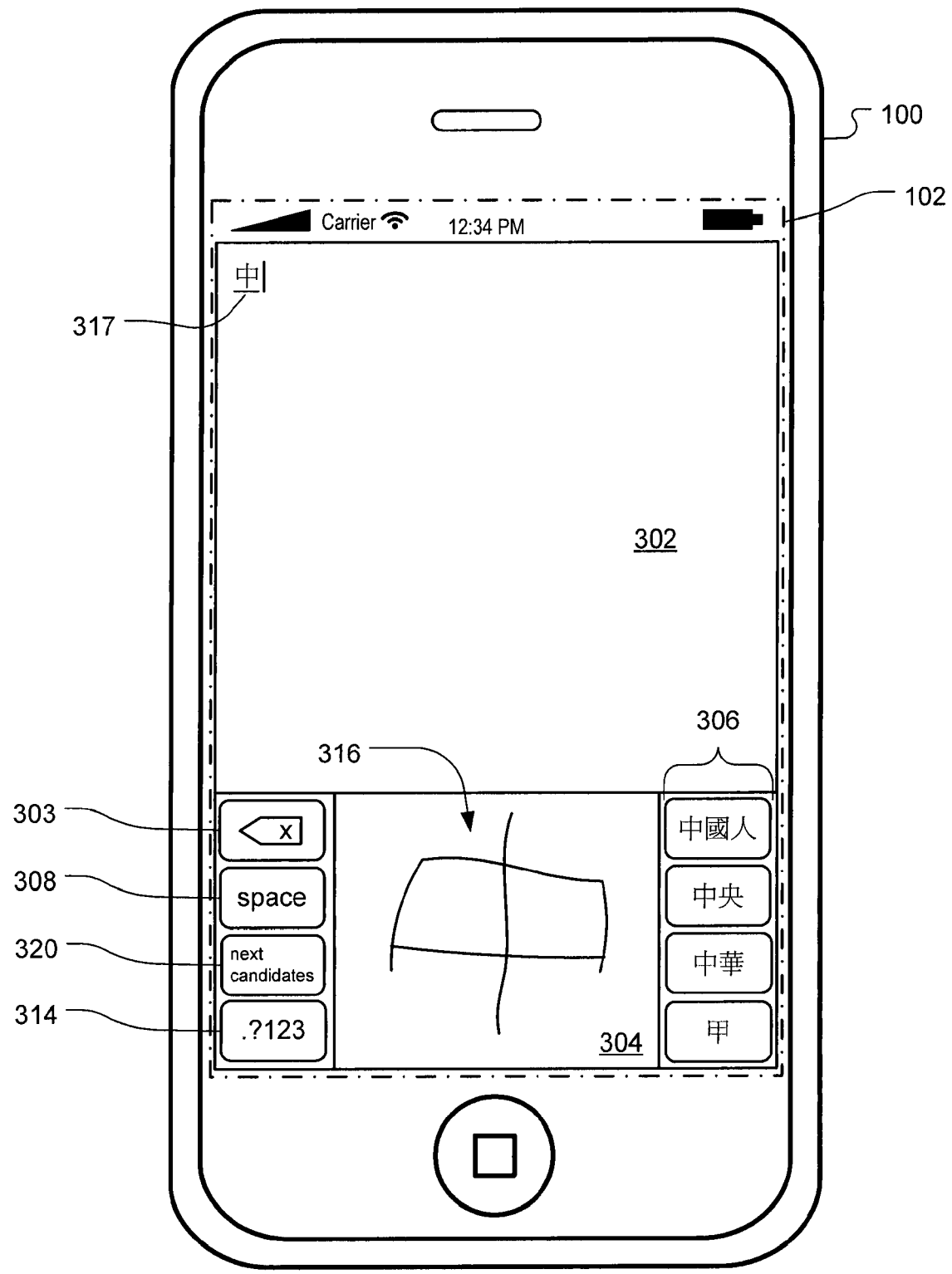

The user can hit the next candidates key 320 to show additional candidate keys 306 that correspond to additional candidates for the handwritten input 316. For example, from FIG. 3C, hitting the next candidates key 320 brings up another set of candidates for the candidate keys 306, as shown in FIG. 3D.

The user can accept the current input 317 as is (in FIG. 3C, the current input 317 is the character "中") by hitting the candidate key corresponding to the character "中" 321. The user can select another candidate by hitting the desired candidate key 306. For example, the user can select the candidate "中國" by selecting key 322.

Figure 3E:
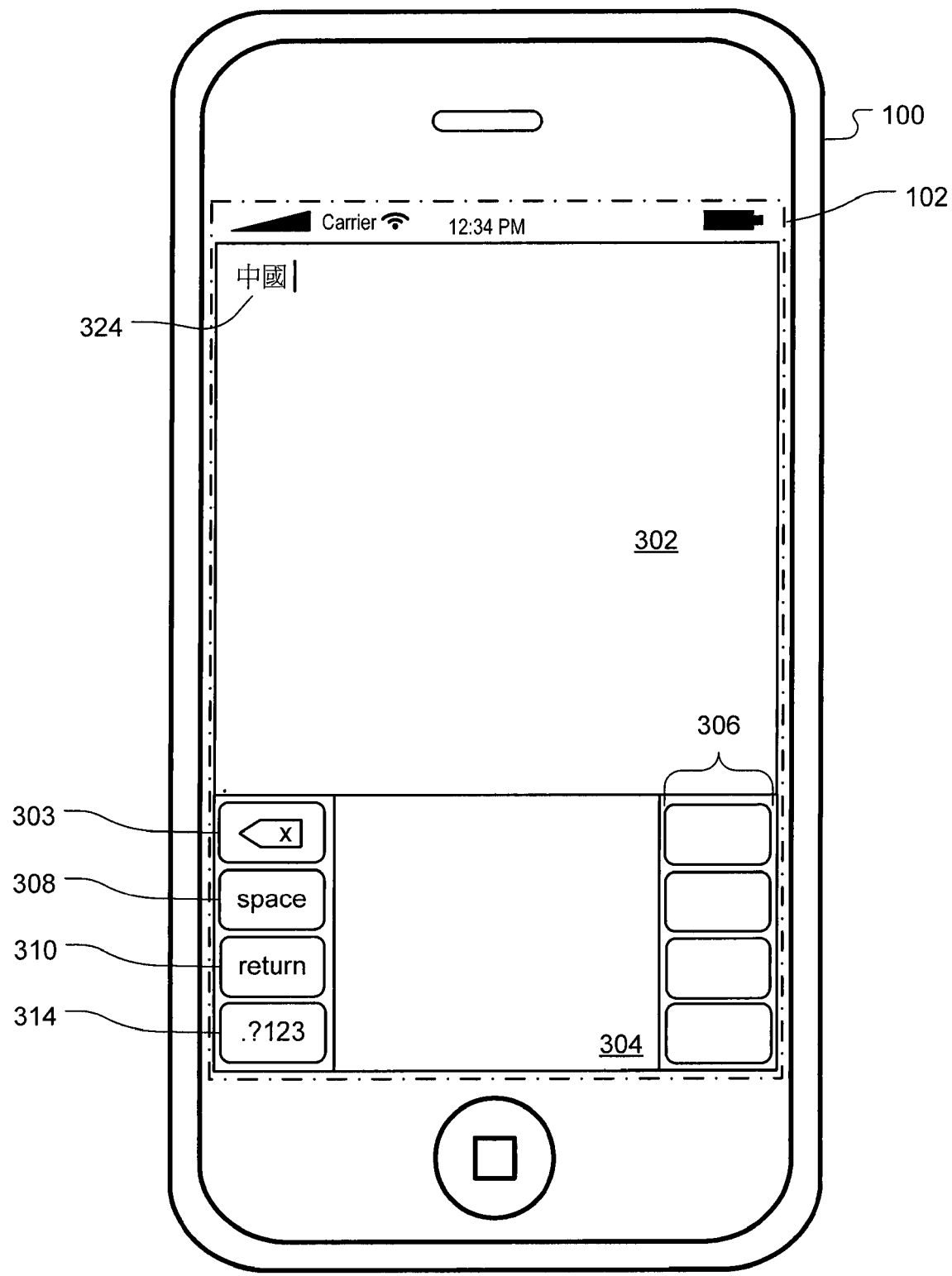

When the user selects a candidate, the handwriting area 304 and the candidate keys can be reset, as shown in FIG. 3E. The selected candidate is displayed as accepted input 324 with no underlining. For example, if the user hits key 322 to select the candidate "中國", "中國" is displayed as the accepted input 324, as shown in FIG. 3E.

Figure 3F:
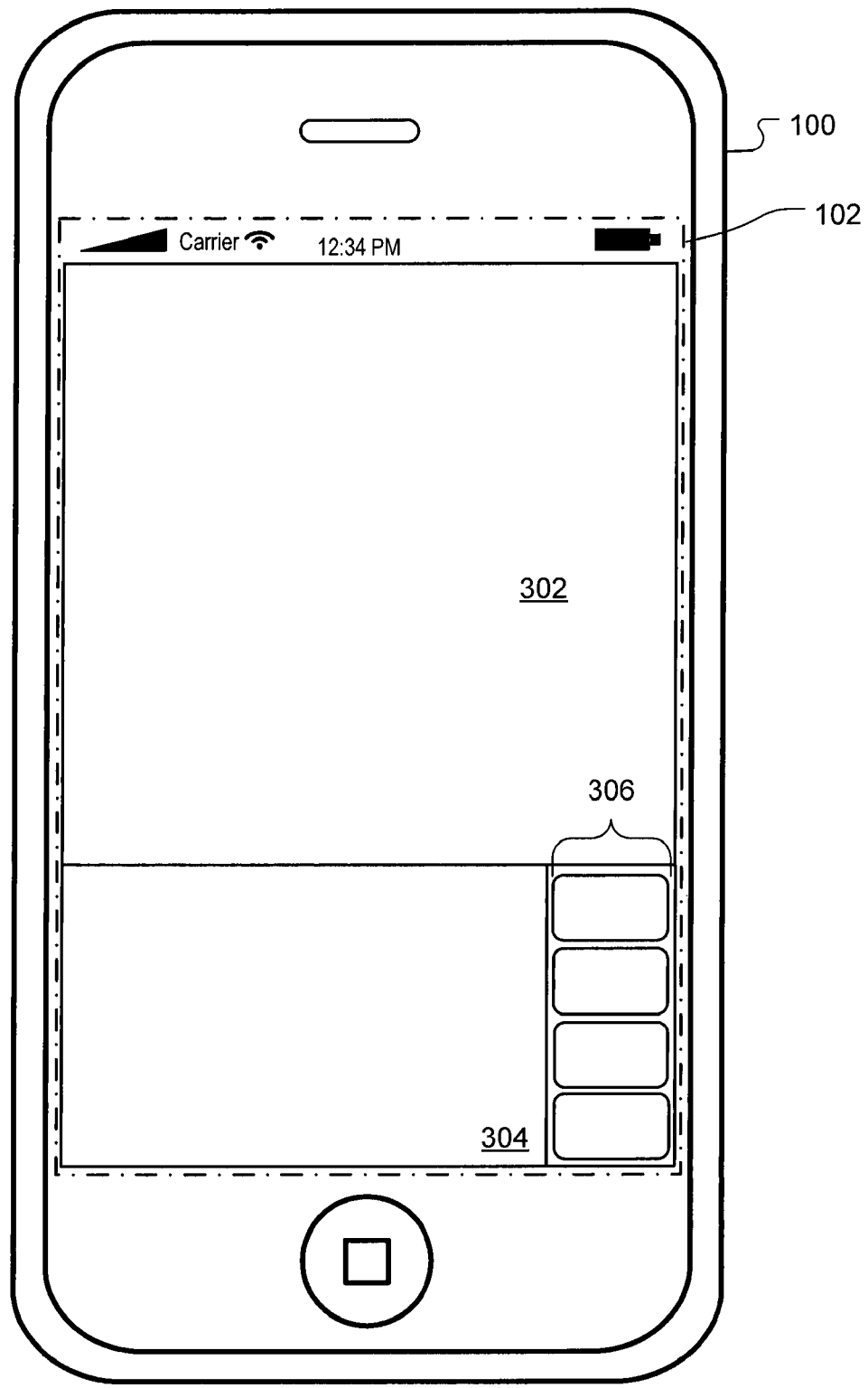

In some implementations, the functionality of some virtual keys (e.g., keys 303, 308 318, 320, 314) can be activated using gestures. For example, the keys 303, 308, 310, 320, 314 can be elided from display and the handwriting area 304 expanded, as shown in FIG. 3F, and the functionality previously associated with keys 303, 308, 310, 320, 314 is activated by gestures (e.g., horizontal or diagonal swipe, etc.). Thus, for example, when the user is using the handwriting area 304 to enter text, the user can perform a gesture on the handwriting area 304 to add a space or delete a character, for example. In some implementations, the gestures are predefined such that they are easily distinguishable by the device 100 from character strokes. In some implementations, the touch-sensitive display is a multi-touch sensitive display, and the gestures are multi-touch gestures.

In some implementations, when the user draws a handwritten input and then the user stops drawing and does not select any candidate for a predetermined time delay (e.g., 3 seconds), the device 100 auto-selects the "best" single-character candidate. If the user did not want the auto-confirmed candidate, the user can drag the auto-confirmed candidate from the text input area 302 into the handwriting area 304 perform a predefined gesture, to signal that the handwritten input is incomplete.

In some implementations, the set of candidate keys 306 can be scrolled through using gestures. For example, the user can perform a vertical swipe gesture along the candidate keys 306 to scroll through the candidates like a rolodex.

In some implementations, the candidates are identified and ordered using predictive text and/or error correction techniques. Examples of predictive text techniques are disclosed in Masui, "An Efficient Text Input Method for Pen-based Computers," in *Proceedings of the ACM Conference on Human Factors in Computing Systems* (CHI '98), Addison-Wesley, April 1998, pp. 328-335; and Masui, "PO Box: An Efficient Text Input Method for Handheld and Ubiquitous Computers," in *Proceedings of the International Symposium on Handheld and Ubiquitous Computing* (HUC '99), pp. 289-300, September 1999, the disclosures of which are incorporated by reference herein in their entirety.

In some implementations, the handwriting area 304 is sized such that usage of a finger to draw a handwritten input, as opposed to using a stylus, is practical. For example, the height and the width of the handwriting area 304 can each be at least double the width of an average human index finger.

Figure 4:
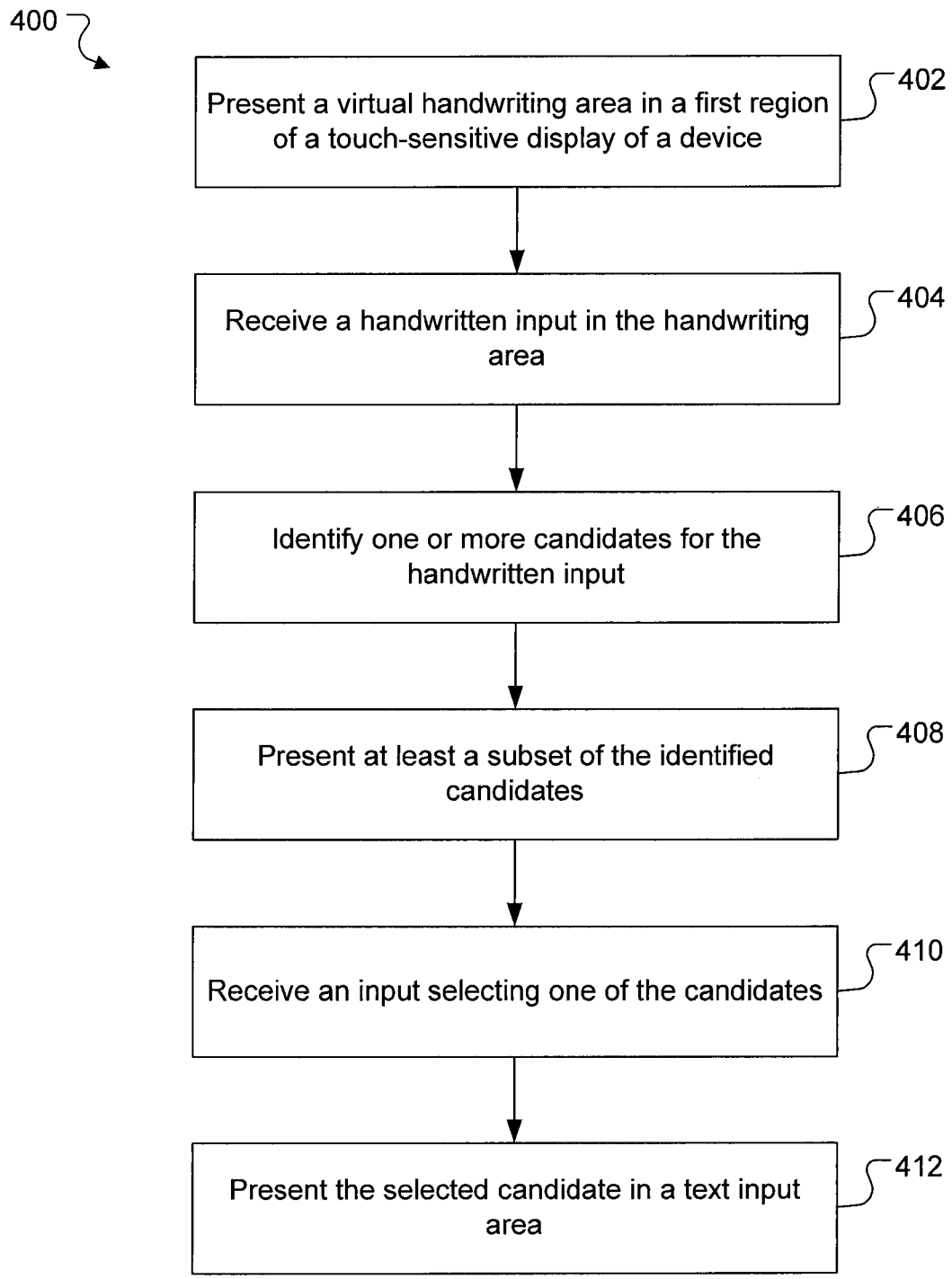
FIG. 4 illustrates an example process for entering text on a portable device.

FIG. 4 illustrates an example process 400 for entering text on a portable device with a touch-sensitive display. For convenience, process 400 will be described in reference to a system (e.g., device 100) that performs the process.

A virtual handwriting area is presented in a first region of a touch-sensitive display of a device (402). For example, when a user opens an application on the device 100 that includes text entry, the device 100 can display a virtual handwriting area on the touch-sensitive display.

A handwritten input is received in the handwriting area (404). The user can, by hand, draw an input in the handwriting area. The user can, for example, draw or write (or at least attempt to draw or write) a Chinese character in the handwriting area. The handwritten input is displayed in the handwriting area, to show what the user has drawn.

In response to the handwritten input, one or more candidates are identified (406). The candidates can include single characters and/or multi-character words or phrases. In some implementations, the device 100 compares the handwritten input to a dictionary and identifies characters, words, and phrases in the dictionary whose leading character match or resemble the handwritten input.

In some implementations, the identification of candidate characters includes ordering the candidate characters based on one or more criteria. The ordering gives the user an indication of what the device 100 determines to be the best candidates.

At least a subset of the candidates is presented to the user (408). For example, the device 100 can display one or more of the candidates for review and possible selection by the user. In some implementations, a candidate is assigned to a candidate key 306 and displayed with the candidate key to which the candidate is assigned. A candidate can also be displayed inline as a provisional current input. For example, the device 100 can display the "best" candidate in a text input area as the provisional current input.

An input is received selecting one of the candidates (410). For example, the user can select a candidate key 306 to select the corresponding candidate.

The selected candidate is presented in the text input area (412). The selected candidate is displayed as the current input in the text input area. The device 100 can reset the handwriting area and candidate keys for the next handwritten input.

In some implementations, the touch-sensitive display 102 is pressure-sensitive and can detect differences in the amount of pressure that is applied to the display 102. In some implementations, when a handwriting input is drawn on a pressure-sensitive touch-sensitive display, the pressure information is used to render the text input displayed in the text input area 302 in a more aesthetically pleasing manner. The pressure sensitivity can also be used to distinguish between strokes that are intended to draw a handwritten input and inadvertent strokes.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
    receiving a handwritten input on a touch-sensitive display of a device, the touch-sensitive display being configured to sense a writing component of the handwritten input and a pressure component of the handwritten input;
    determining whether the handwritten input corresponds to character input or gesture input based at least partially on the pressure component;
    if the handwritten input corresponds to character input:
        identifying one or more candidates for the handwritten input;
        presenting the one or more candidates;
        presenting one of the candidates as a provisional current input;
        receiving an input selecting one of the candidates; and
        presenting the selected candidate as an accepted input; and
    if the handwritten input corresponds to gesture input, performing a function associated with an identified gesture.

2. The method of claim 1, wherein the candidates comprise Chinese characters.

3. The method of claim 1, wherein:
    presenting the one or more candidates comprises presenting one or more virtual buttons, each virtual button corresponding to a respective candidate; and
    receiving an input selecting one of the candidates comprises receiving an input selecting one of the virtual buttons.

4. The method of claim 1, wherein the touch-sensitive display is a multi-touch sensitive display.

5. The method of claim 1, wherein the one or more candidates are presented in an order that is based on which candidates are the best candidates for the handwritten input.

6. The method of claim 1, wherein the candidate presented as the provisional current input is the best candidate for the handwritten input.

7. The method of claim 1, wherein identifying the one or more candidates for the handwritten input comprises identifying the one or more candidates for the handwritten input based at least partially on both the writing component and the pressure component.

8. The method of claim 1, further comprising ignoring a portion of the handwritten input based at least partially on the pressure component.

9. The method of claim 1, wherein presenting the one of the candidates as the provisional current input and presenting the selected candidate as the selected input are based at least partially on the pressure component.

10. The method of claim 1, wherein the function comprises a space function.

11. The method of claim 1, wherein the function comprises a delete function.

12. A portable device comprising:
    a touch-sensitive display;
    memory;
    one or more processors; and
    instructions stored in the memory and configured for execution by the one or more processors, the instructions comprising instructions to:
        receive a handwritten input on the touch-sensitive display, the touch-sensitive display being configured to sense a writing component of the handwritten input and a pressure component of the handwritten input;
        determine whether the handwritten input corresponds to character input or gesture input based at least partially on the pressure component;
        if the handwritten input corresponds to character input:
            identify one or more candidates for the handwritten input;
            present the one or more candidates;
            present one of the candidates as a provisional current input;
            receive an input selecting one of the candidates; and
            present the selected candidate as an accepted input; and
        if the handwritten input corresponds to gesture input, perform a function associated with an identified gesture.

13. The device of claim 12, wherein the touch-sensitive display is a multi-touch sensitive display.

14. The device of claim 12, wherein identifying the one or more candidates for the handwritten input comprises identifying the one or more candidates for the handwritten input based at least partially on both the writing component and the pressure component.

15. The device of claim 12, wherein the instructions comprise further instructions to ignore a portion of the handwritten input based at least partially on the pressure component.

16. The device of claim 12, wherein presenting the one of the candidates as the provisional current input and presenting the selected candidate as the selected input are based at least partially on the pressure component.

17. A non-transitory computer-readable medium including one or more sequences of instructions which, when executed by one or more processors, causes:
- receiving a handwritten input on a touch-sensitive display of a device, the touch-sensitive display being configured to sense a writing component of the handwritten input and a pressure component of the handwritten input;
- determining whether the handwritten input corresponds to character input or gesture input based at least partially on the pressure component;
- if the handwritten input corresponds to character input:
  - identifying one or more candidates for the handwritten input;
  - presenting the one or more candidates;
  - presenting one of the candidates as a provisional current input;
  - receiving an input selecting one of the candidates; and
  - presenting the selected candidate as an accepted input; and
- if the handwritten input corresponds to gesture input, performing a function associated with an identified gesture.

18. The non-transitory computer-readable medium of claim 17, wherein the touch-sensitive display is a multi-touch sensitive display.

19. The non-transitory computer-readable medium of claim 17, wherein identifying the one or more candidates for the handwritten input comprises identifying the one or more candidates for the handwritten input based at least partially on both the writing component and the pressure component.

20. The non-transitory computer-readable medium of claim 17, wherein the instructions further cause ignoring a portion of the handwritten input based at least partially on the pressure component.

* * * * *